United States Patent
Wang

(10) Patent No.: US 12,389,488 B2
(45) Date of Patent: Aug. 12, 2025

(54) METHOD FOR WIRELESS COMMUNICATION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 390 days.

(21) Appl. No.: 18/148,356

(22) Filed: Dec. 29, 2022

(65) Prior Publication Data
US 2023/0140820 A1 May 4, 2023

Related U.S. Application Data

(63) Continuation of application No. PCT/CN2020/101372, filed on Jul. 10, 2020.

(51) Int. Cl.
*H04W 76/27* (2018.01)
*H04W 52/02* (2009.01)
*H04W 72/20* (2023.01)

(52) U.S. Cl.
CPC ....... *H04W 76/27* (2018.02); *H04W 52/0206* (2013.01); *H04W 72/20* (2023.01)

(58) Field of Classification Search
CPC .. H04W 76/27; H04W 72/20; H04W 52/0206
See application file for complete search history.

(56) References Cited

U.S. PATENT DOCUMENTS

| | | |
|---|---|---|
| 9,538,575 B2 | 1/2017 | Yamada |
| 9,820,332 B2 | 11/2017 | Lee |
| 9,967,784 B2 | 5/2018 | Kim |
| 10,511,981 B2 | 12/2019 | Lee |
| 10,536,882 B2 | 1/2020 | Kim |
| 2015/0215965 A1 | 7/2015 | Yamada |
| 2015/0271726 A1 | 9/2015 | Kim et al. |

(Continued)

FOREIGN PATENT DOCUMENTS

| | | |
|---|---|---|
| CN | 106538034 A | 3/2017 |
| CN | 111034347 A | 4/2020 |

(Continued)

OTHER PUBLICATIONS

3GPP TSG-RAN WG2#107bis R2-1912880, Chongqing, China, Oct. 14-18, 2019, Agenda Item: 6.10.4.3, Source: Interdigital (Rapporteur), Title: Report on email discussion on [107#32][NR/DCCA] MCG SCell/SCG Resume, Document for: Discussion, Decision.

(Continued)

*Primary Examiner* — Sujoy K Kundu
*Assistant Examiner* — Weibin Huang
(74) *Attorney, Agent, or Firm* — Ladas & Parry, LLP

(57) ABSTRACT

A method for wireless communication, a terminal device, and a network device are provided. The method includes: transmitting, by a terminal device, first information to a network device, herein the first information indicates whether the terminal device expects to activate an SCG in an RRC connection resume process.

20 Claims, 11 Drawing Sheets

(56) References Cited

U.S. PATENT DOCUMENTS

| | | | |
|---|---|---|---|
| 2016/0044744 A1 | 2/2016 | Lee et al. | |
| 2018/0035485 A1 | 2/2018 | Lee et al. | |
| 2018/0255488 A1 | 9/2018 | Kim et al. | |
| 2020/0077308 A1 | 3/2020 | Kim et al. | |
| 2020/0245388 A1* | 7/2020 | Byun | H04W 76/27 |
| 2021/0168893 A1* | 6/2021 | Al | H04W 76/11 |
| 2021/0250156 A1* | 8/2021 | Kim | H04W 72/23 |
| 2022/0150774 A1* | 5/2022 | Wu | H04W 36/305 |
| 2022/0279552 A1* | 9/2022 | Teyeb | H04W 40/22 |
| 2023/0164871 A1* | 5/2023 | Jung | H04W 24/08 |
| | | | 370/328 |

FOREIGN PATENT DOCUMENTS

| | | |
|---|---|---|
| CN | 111093237 A | 5/2020 |
| CN | 111225396 A | 6/2020 |
| WO | 2019022531 A1 | 1/2019 |
| WO | 2019237359 A1 | 12/2019 |
| WO | 2022/006863 A1 | 1/2022 |

OTHER PUBLICATIONS

3GPP TSG RAN WG2 Meeting #107bis R2-1912194, Chongqing, China, Oct. 14-18, 2019, Agenda item: 6.10.4.3, Source: Qualcomm Incorporated, Title: Further discussion on NR SCG resume procedure, WID/SID: LTE_NR_DC_CA_enh-Core—Release 16, Document for: Discussion and Decision.

First Office Action and search report of the Chinese patent application No. 202080101097.9, issued on Jun. 1, 2024cwith English translation.

Huawei, "New WID on further enhancements on Multi-Radio Dual-Connectivity" 3GPP TSG RAN Meeting #86 RP-193249, Sitges, Spain, Dec. 9-12, 2019, all pages.

International Search Report in the international application No. PCT/CN2020/101372, mailed on Apr. 1, 2021.

Written Opinion of the International Search Authority in the international application No. PCT/CN2020/101372, mailed on Apr. 1, 2021.

3GPP TS 38.300 V16.1.0 (Mar. 2020), 3rd Generation Partnership Project; Technical Specification Group Radio Access Network; NR; NR and NG-RAN Overall Description; Stage 2 (Release 16), all pages.

* cited by examiner

METHOD FOR WIRELESS COMMUNICATION, TERMINAL DEVICE, AND NETWORK DEVICE

CROSS REFERENCE TO RELATED APPLICATION

This is a continuation of International Patent Application No. PCT/CN2020/101372 filed on Jul. 10, 2020, the disclosure of which is hereby incorporated by reference in its entirety.

BACKGROUND

A New Ratio (NR) communication system can support a Multi-Radio Access Technology (RAT) Dual Connectivity (MR-DC) scenario. Moreover, in order to support a terminal device to save energy and quickly establish a Secondary Cell Group (SCG), a suspend state of the SCG is introduced. In the suspend state of the SCG, all cells in the SCG may not monitor a Physical Downlink Control Channel (PDCCH), and not perform data transceiving. However, how to process the state of the SCG in a Radio Resource Control (RRC) connection resume process of a terminal device in an inactive state is an urgent problem to be solved.

SUMMARY

Embodiments of the disclosure relate to the field of communication, and in particular to a method for wireless communication, a terminal device, and a network device.

In a first aspect, there is provided a wireless communication method, which includes the following operation.

A terminal device transmits first information to a network device. The first information indicates whether the terminal device expects to activate an SCG in an RRC connection resume process.

In a second aspect, there is provided a terminal device, which includes: a processor; a transceiver; and a memory for storing a computer program that, when executed by the processor, cause the processor to control the transceiver to: transmit first information to a network device, herein the first information indicates whether the terminal device expects to activate an SCG in an RRC connection resume process.

In a third aspect, there is provided a network device, which includes: a processor; a transceiver; and a memory for storing a computer program that, when executed by the processor, cause the processor to control the transceiver to: receive first information transmitted by a terminal device, herein the first information indicates whether the terminal device expects to activate an SCG in an RRC connection resume process.

DETAILED DESCRIPTION

Figure 1:
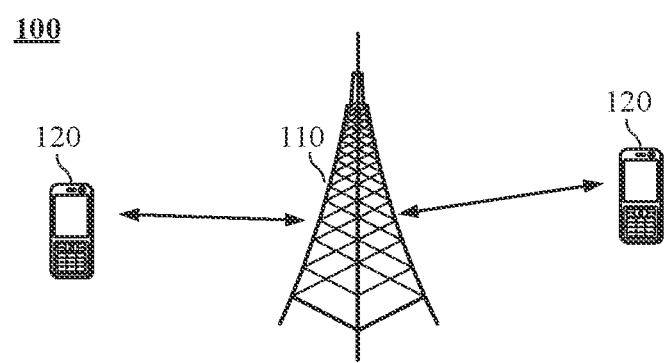
FIG. 1 illustrates a schematic diagram of communication system architecture according to an embodiment of the disclosure.

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, such as a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, an LTE-based access to unlicensed spectrum (LTE-U) system, an LTE-based access to unlicensed spectrum (LTE-U) system, a Non-Terrestrial Networks (NTN) system, a Universal Mobile Telecommunication System (UMTS), a Wireless Local Area Network (WLAN), a Wireless Fidelity (WiFi) system, a 5th-Generation (5G) system, or other communication systems.

Generally speaking, traditional communication systems support a limited number of connections and are easy to implement. However, with the development of the communication technology, mobile communication systems will not only support traditional communication, but also support, for example, Device to Device (D2D) communication, Machine to Machine (M2M) communication, Machine Type Communication (MTC), Vehicle to Vehicle (V2V) communication, Vehicle to Everything (V2X) communication, or the like. The embodiments of the disclosure can also be applied to these communication systems.

Optionally, the communication system in the embodiments of the disclosure may be applied to a Carrier Aggregation (CA) scenario, or may also be applied to a Dual Connectivity (DC) scenario, or may also be applied to a Standalone (SA) networking scenario.

Optionally, the communication system in the embodiments of the disclosure may be applied to an unlicensed spectrum, herein the unlicensed spectrum may also be considered as a shared spectrum; or, the communication system in the embodiments of the disclosure may also be applied to a licensed spectrum, herein the licensed spectrum may also be considered as a non-shared spectrum.

In the embodiments of the disclosure, various embodiments are described with reference to a network device and a terminal device. The terminal device may also be referred to as a User Equipment (UE), an access terminal, a user unit, a user station, a mobile station, a mobile radio station, a remote station, a remote terminal, a mobile device, a user terminal, a terminal, a wireless communication device, a user agent, a user apparatus, or the like.

The terminal device may be a Station (ST) in the WLAN, may be a cellular phone, a cordless phone, a Session Initiation Protocol (SIP) phone, a Wireless Local Loop (WLL) station, a Personal Digital Assistant (PDA), a hand-held device having a wireless communication function, a computing device or other processing devices connected to a wireless modem, an on-board device, a wearable device, a terminal device in the next generation communication system, such as NR network, a terminal device in a Public Land Mobile Network (PLMN) in future evolution, or the like.

In the embodiments of the disclosure, the terminal device may be deployed on land, including indoor or outdoor, hand-held, wearable or on-board, may also be deployed on water (for example, a ship), and may also be deployed in air (for example, on an aircraft, a balloon, and a satellite).

In the embodiments of the disclosure, the terminal device may be a mobile phone, a pad, a computer with a wireless transceiving function, a Virtual Reality (VR) terminal device, an Augmented Reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city (smart city), a wireless terminal device in a smart home, and the like.

As an example rather than a limitation, in the embodiments of the disclosure, the terminal device may also be a wearable device. The wearable device, also referred to as a wearable intelligent device, is a generic term of wearable devices obtained by performing intelligent designing and development on daily wearing products, such as glasses, gloves, watches, clothes, and shoes, by applying a wearable technology. The wearable device is a portable device that is directly put on a human body or is integrated with clothes or ornaments of a user. The wearable device is not merely a hardware device, but further implements a powerful function through software support, data exchange, and cloud-based interaction. Generalized wearable intelligent devices include, for example, intelligent watches or intelligent glasses with complete functions and large sizes and capable of realizing all or part of functions independent of intelligent phones, and for example, various types of sign monitoring intelligent bands and intelligent jewelries of which each is dedicated to application functions of a certain type and required to be matched with other devices such as intelligent phones for use.

In the embodiments of the disclosure, the network device may be a device for communicating with a mobile device. The network device may be an Access Point (AP) in WLAN, a Base Transceiver Station (BTS) in GSM or CDMA, or may be a NodeB (NB) in WCDMA, or may be an Evolutional Node B (eNB or eNodeB) in LTE, or a relay station or an access point, or an on-board device, a wearable device, or a network device or a gNB in an NR network, or a network device in a PLMN network in future evolution, or a network device in an NTN network, or the like.

As an example rather than a limitation, in the embodiments of the disclosure, the network device may have mobility, for example, the network device may be a mobile device. Optionally, the network device may be a satellite or a balloon station. For example, the satellite may be a Low Earth Orbit (LEO) satellite, a Medium Earth Orbit (MEO) satellite, a Geosynchronous Earth Orbit (GEO) satellite, a High Elliptical Orbit (HEO) satellite, and the like. Optionally, the network device may also be a base station arranged on at the positions, such as land and water.

In the embodiments of the disclosure, the network device may provide a service for a cell, and the terminal device communicates with the network device through a transmission resource (for example, a frequency-domain resource or a spectrum resource) used by the cell. The cell may be a cell corresponding to the network device (for example, a base station). The cell may belong to a macro base station, or belong to a base station corresponding to a small cell. Here, the small cell may include: a metro cell, a micro cell, a pico cell, a femto cell, and the like. These small cells have the characteristics of small coverage and low transmitting power, and are suitable for providing high-rate data transmission services.

Exemplarily, the communication system 100 applied to the embodiments of the disclosure is as shown in FIG. 1. The communication system 100 may include a network device 110. The network device 110 may be a device in communication with a terminal device 120 (or called a communication terminal device or a terminal). The network device 110 may provide communication coverage for a specific geographical area, and may communicate with the terminal device located within the coverage.

FIG. 1 exemplarily illustrates a network device and two terminal devices. Optionally, the communication system 100 may include a plurality of network devices and other numbers of terminal devices may be included within a coverage area of each network device, which are not limited in the embodiments of the present disclosure.

Optionally, the communication system 100 may further include other network entities such as a network controller, a mobility management entity, which are not limited by the embodiments of the present disclosure.

It should be understood that a device having a communication function in a network/system in the embodiments of the present disclosure may be referred to as a communication device. As an example of the communication system 100 illustrated in FIG. 1, the communication device may include a network device 110 and a terminal device 120 having a communication function. The network device 110 and the terminal device 120 may be specific devices described above, and details are not described herein. The communication device may also include other devices in the communication system 100, such as network controllers, mobility management entities, and other network entities, which are not limited in the embodiments of the present disclosure.

It should be understood that the terms "system" and "network" are used interchangeably herein. The term "and/or" in the disclosure means only an association relationship describing associated objects and represents that three relationships may exist. For example, A and/or B may represent three conditions: i.e., independent existence of A, existence of both A and B and independent existence of B. In addition, character "I" in the disclosure usually represents that previous and next associated objects form an "or" relationship.

It is to be understood that the "indication" mentioned in the embodiments of the disclosure may be direct indication, or indirect indication, or indicate that there is an association relationship. For example, A indicating B may indicate that A directly indicates B, for example, B may be acquired through A, or indicate that A indirectly indicates B, for example, A indicates C, and B may be acquired through C, or indicate that there is an association relationship between A and B.

In the description of the embodiments of the disclosure, the term "correspondence" can indicate that there is a direct or indirect correspondence between the two, or that there is an association between them, or that there is a relationship between indication and being indicated, configuration and being configured, etc.

It is to be understood that the embodiments of the disclosure may be applied to Dual Connectivity (DC), or may also be referred to as an MR-DC scenario.

It is to be noted that the MR-DC may include an LTE NR DC (EN-DC), an NR eLTE DC (NE-DC), a 5GC eLTE NR DC (5GC-EN-DC), an NR DC. In EN-DC, an Evolved Packet Core (EPC) is connected by taking an LTE node as a Master Node (MN), and an NR node as a Slave Node (SN). In NE-DC, a 5-Generation Core (5GC) is connected by taking the NR as an MN node, and Evolved Long Term Evolution (eLTE) as an SN node. In 5GC-EN-DC, the 5GC is connected by taking the eLTE as an MN node, and the NR as an SN node. In NR DC, the 5GC is connected by taking the NR as an MN node, and the NR as an SN node.

The MN node mainly realizes an RRC control function and a control plane to the CN. The SN node may configure auxiliary signaling, such as Signaling Radio Bearers 3 (SRB3), which mainly provides a data transmission function.

Figure 2:
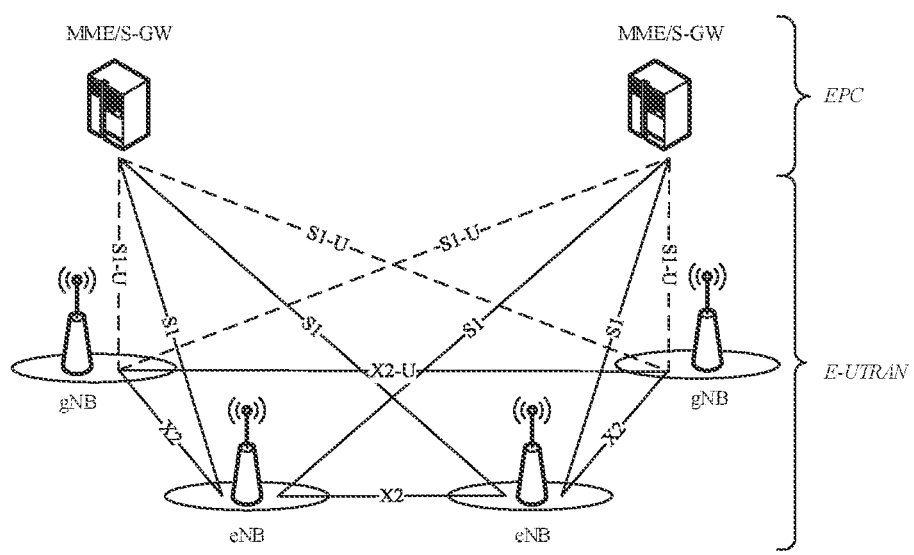
FIG. 2 illustrates a schematic diagram of MR-DC system architecture according to an embodiment of the disclosure.

For example, network architecture of the EN-DC may be as shown in FIG. 2. Taking eNB as an MN node and gNB as an SN node, the eNB is connected to a Mobility Management Entity (MME) or Serving Gateway (S-GW) through S1 interface. The gNB is connected to the MME or the S-GW through S1-U interface (S1 interface on a user side). Two eNB s are connected with each other through X2 interface. Two gNB s are connected with each other through X2-U interface (X2 interface on the user side). The eNB is connected to the gNB through X2 interface. The eNB mainly realizes an RRC control function and a control plane to the CN. The gNB may configure auxiliary signaling, such as SRB3, which mainly provides a data transmission function.

The NR may also be deployed independently. In 5G NR, the maximum channel bandwidth can be 400 MHz (wideband carrier). Compared with the maximum 20 M bandwidth of LTE, the bandwidth is very large. If the terminal device keeps working on the wideband carrier, the power consumption of the terminal device is very high. Therefore, it is recommended that the Radio Frequency (RF) bandwidth of the terminal device may be adjusted according to the actual throughput of the terminal device. Therefore, the motivation for introducing a Bandwidth Part (BWP) is to optimize the power consumption of an UE. For example, if the rate of the terminal device is very low, a smaller bandwidth may be configured for the terminal device. If the rate of the terminal device is required to be very high, a larger bandwidth may be configured for the terminal device. If the terminal device supports high rate, or is operated in a CA mode, a plurality of BWPs may be configured. Another purpose of the BWP is to trigger the coexistence of a plurality of numerologies in a cell.

The network device may configure at most 4 uplink (UL) BWPs and at most 4 downlink (DL) BWPs for a terminal device through RRC dedicated signaling, but only one DL BWP and UL BWP can be activated at the same time. The RRC dedicated signaling may indicate a BWP being first activated in the configured BWPs. Moreover, in a connected state, the terminal device may also be switched between different BWPs through Downlink Control Information (DCI). After an inactive carrier enters an active state, a BWP being first activated is the BWP being first activated configured in the RRC.

Specifically, the configuration parameters of each BWP include:
subcarrier spacing (subcarrierSpacing);
cyclic prefix (cyclicPrefix);
a first Physical Resource Block (PRB) of the BWP, and location and bandwidth (locationAndBandwidth) of continuous PRB numbers;
BWP Identifier (bwp-Id); and
BWP Common (bwp-Common) configuration parameters and BWP Dedicated (bwp-Dedicated) configuration parameters.

The terminal device only performs Radio Link Monitoring (RLM) on an active BWP, and the inactive BWP does not need to be operated. When the terminal device is switched between different BWPs, a timer and a counter related to the RLM do not need to be reset. For the measurement of Radio Resource Management (RRM), no matter the terminal device transmits or receives data on which active BWP, the measurement of RRM is not affected. For the measurement of a Channel Quantity Indicator (CQI), the terminal device also needs to execute on an active BWP.

When one carrier is deactivated, and then the carrier is activated through a Media Access Control Control Element (MAC CE), an initial BWP being first activated is a BWP corresponding to an Identifier (id) of a BWP being first activated in the RRC signaling.

The value of the BWP id in the RRC signaling is 0 to 4, and 0 defaults to an initial BWP.

A BWP indicator in the DCI is 2 bits. If the number of the configured BWPs is less than or equal to 3, then the BWP indicator=1, 2, 3 correspond to BWP id=1, 2, 3 respectively. If the number of the BWPs is 4, BWP indicator=0, 1, 2, 3 respectively correspond to the BWPs configured according to a sequential index, as shown in Table 1. Moreover, continuous BWP ids are used when the BWP is configured on the network side.

TABLE 1

| Value of BWP indicator field 2 bits | BWP |
|---|---|
| 00 | First BWP configured by high layers |
| 01 | Second BWP configured by high layers |
| 10 | Third BWP configured by high layers |
| 11 | Fourth BWP configured by high layers |

In order to support the terminal device to save energy and quickly establish an SCG, the concept of a suspend SCG is introduced. The suspend SCG means that all cells in the SCG are in a suspend state. In the suspend cell, PDCCH is not monitored, data transmission and reception are not performed, but RRM, Channel State Information (CSI) measurement, beam management, and the like are performed. For the terminal device in an RRC_INACTIVE state, in an RRC connection resume process, the SCG is activated by default (that is, switched from a suspend state into an active state). However, in some scenarios, the SCG does not need to be activated, for example, in a scenario where only a bearer of a Master Cell Group (MCG) has a data transmission and reception demand.

Based on the abovementioned problems, the disclosure provides a solution for determining whether to activate an SCG in the RRC connection resume process. The terminal device and the network device coordinate to determine whether to activate the SCG in the RRC connection resume process, so as to accurately determine whether to activate the SCG, which avoids unnecessary SCG activation, and achieves the purpose of saving energy for the terminal device.

The technical solution of the disclosure is described in detail by the following to specific embodiments.

Figure 3:
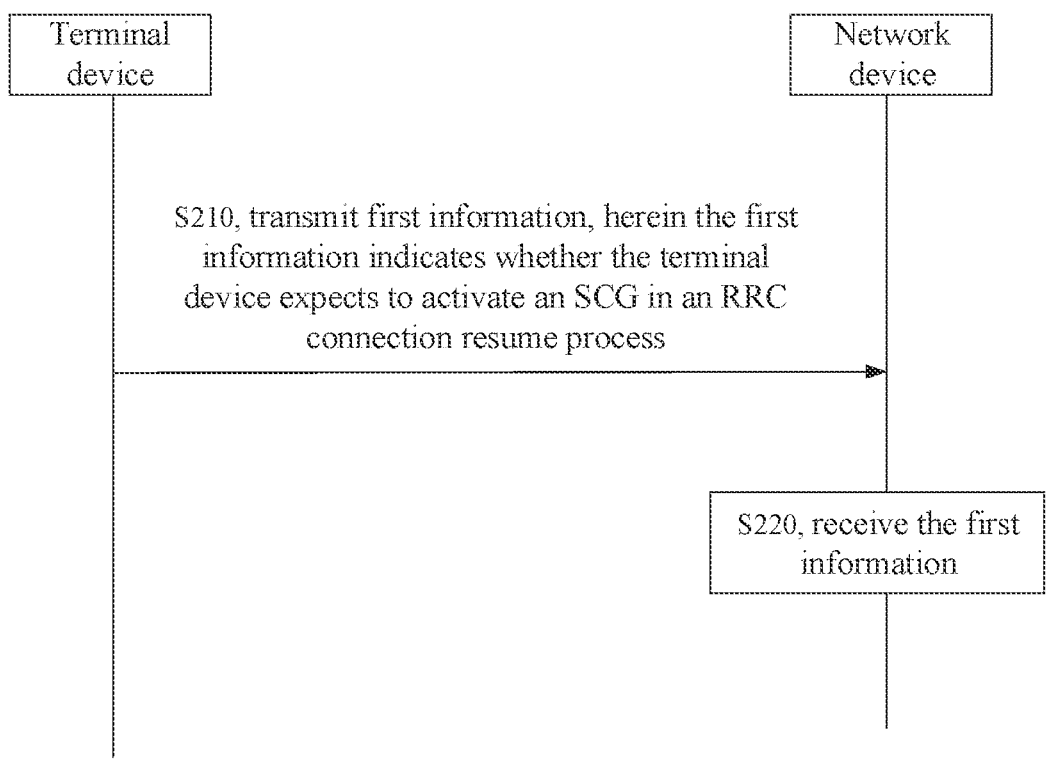
FIG. 3 illustrates a schematic flowchart of a method for wireless communication according to an embodiment of the disclosure.

FIG. 3 illustrates a schematic flowchart of a method for wireless communication 200 according to an embodiment of the disclosure. As shown in FIG. 2, the method 200 may include at least part of the following contents.

At S210, a terminal device transmits first information to a network device. The first information indicates whether the terminal device expects to activate an SCG in an RRC connection resume process.

At S220, the network device receives the first information transmitted by the terminal device.

In the embodiments of the disclosure, the terminal device is in an inactive state.

It is to be noted that, when the terminal device is in an inactive state, the SCG is in a suspend state, that is, all cells in the SCG are in a suspend state. In the suspend cell, PDCCH is not monitored, data transmission and reception are not performed, but RRM, CSI measurement, beam management, and the like are performed. That is, before resuming of the RRC connection, the SCG is in a suspend state.

In the embodiments of the disclosure, the operation that the SCG is activated may be understood that all cells in the SCG are activated, and may also be understood that a specific cell in the SCG is activated. The specific cell may be, for example, a cell that needs to perform data reception and/or transmission.

It is also to be noted that the SCG being in a suspend state may also be referred to as that the SCG being in a dormancy state, or, the SCG being in a suspend state may also be referred to as that the SCG being in an inactive state. No limits are made thereto in the disclosure.

Optionally, the terminal device is in an MR-DC scenario before entering the inactive state.

It is to be noted that the MR-DC may include an EN-DC, an NE-DC, a 5GC-EN-DC, an NR DC. In EN-DC, an EPC is connected by taking an LTE node as an MN, and an NR node as an SN. In NE-DC, the 5GC is connected by taking the NR as an MN node, and an eLTE as an SN node. In 5GC-EN-DC, the 5GC is connected by taking the eLTE as an MN node, and the NR as an SN node. In NR DC, the 5GC is connected by taking the NR as an MN node, and the NR as an SN node. Of course, the MR-DC may also include more DC scenarios. No limits are made thereto in the disclosure.

Optionally, the network device is an MN device serving the terminal device before the terminal device enters an inactive state, or the network device is an MN device other than an MN device serving the terminal device before the terminal device enters an inactive state. For example, since the location of the terminal device changes, the terminal device accesses a new MN device. Certainly, the reason for the terminal device to access the new MN device is not limited to this. No limits are made thereto in the disclosure.

Optionally, the first information is carried in a third message (Message (Msg) 3) in a four-step random access process; or the first information is carried in a first message (Msg A) in a two-step random access process.

Optionally, the first information may be carried in RRC signaling. For example, the RRC is RRC resume request information.

That is to say, the Msg 3 may be the RRC resume request information, and the RRC resume request information includes the first information. Or, the Msg A may be the RRC resume request information, and the RRC resume request information includes the first information.

Optionally, in the embodiments of the disclosure, the first information may explicitly indicate whether the terminal device expects to activate an SCG in an RRC connection resume process. For example, the first information is carried in RRC signaling. and the first information occupies a spare bit in the RRC signaling. When the spare bit is 1, the first information indicates that the terminal device expects to activate an SCG in the RRC connection resume process. When the spare bit is 0, the first information indicates that the terminal device does not expect to activate an SCG in the RRC connection resume process. Certainly, the first information may also occupy other bits in the RRC signaling, or the first information may reuse other bits in the RRC signaling. No limits are made thereto in the disclosure.

Optionally, in the embodiments of the disclosure, the first information may also implicitly indicate whether the terminal device expects to activate an SCG in an RRC connection resume process.

The present disclosure may implicitly indicate whether the terminal device expects to activate an SCG in the RRC connection resume process by the manners described in the following Example 1 to Example 4.

Example 1, Different Common Control Channels (CCCHs) Correspond to Different First Information In a case that the terminal device indicates the first information through a first CCCH, the first information indicates that the terminal device expects to activate the SCG in the RRC connection resume process; and/or, in a case that the terminal device indicates the first information through a second CCCH, the first information indicates that the terminal device does not expect to activate the SCG in the RRC connection resume process.

For example, in a case that the first information is carried in the RRC resume request information, and the terminal device transmits the RRC resume request information by using the first CCCH, the first information indicates that the terminal device expect to activate the SCG in the RRC connection resume process. In this case, the first information may be a Logical Channel Identity (LC ID) of the first CCCH. After acquiring the LC ID of the first CCCH, the network device may learn that the terminal device expect to activate the SCG in the RRC connection resume process.

For another example, in a case that the first information is carried in the RRC resume request information, and the terminal device transmits the RRC resume request information by using a second CCCH, the first information indicates that the terminal device does not expect to activate an SCG in an RRC connection resume process. In this case, the first information may be an LC ID of the second CCCH. After acquiring the LC ID of the second CCCH, the network device may learn that the terminal device does not expect to activate the SCG in the RRC connection resume process.

Optionally, in Example 1, the terminal device transmits the first information to the network device based on a first correspondence.

The first correspondence includes: the first CCCH corresponds to activating the SCG and the second CCCH corresponds to not activating the SCG.

Optionally, the first correspondence is pre-configured or predefined by a protocol, or the first correspondence is configured by the network device.

It is to be noted that, for a network side, the first correspondence may be kept in the MN device, or, the first correspondence may be kept in both the MN device and the SN device.

Example 2, Different Preambles Correspond to Different First Information

In a case that the terminal device indicates the first information through a first preamble, the first information indicates that the terminal device expects to activate the SCG in the RRC connection resume process; and/or, in a case that the terminal device indicates the first information through a second preamble, the first information indicates that the terminal device does not expect to activate the SCG in the RRC connection resume process.

For example, in a case that the first information is carried in the RRC resume request information, and the terminal device initiates a random access process and transmits the RRC resume request information by using the first preamble, the first information indicates that the terminal device expects to activate the SCG in the RRC connection resume process. In this case, the first information may be the first preamble. After acquiring the first preamble, the network device may learn that the terminal device expects to activate the SCG in the RRC connection resume process.

For another example, in a case that the first information is carried in the RRC resume request information, and the terminal device initiates a random access process and transmits the RRC resume request information by using the second preamble, the first information indicates that the terminal device does not expect to activate an SCG in an RRC connection resume process. In this case, the first information may be the second preamble. After acquiring the second preamble, the network device may learn that the terminal device does not expect to activate the SCG in the RRC connection resume process.

Optionally, in Example 2, the terminal device transmits the first information to the network device based on a second correspondence.

The second correspondence includes: the first preamble corresponds to activating the SCG and the second preamble corresponds to not activating the SCG.

Optionally, the second correspondence is pre-configured or predefined by a protocol, or the second correspondence is configured by the network device.

It is to be noted that, for a network side, the second correspondence may be kept in the MN device, or the second correspondence may be kept in both the MN device and the SN device.

Example 3, Different Random Access Resources Correspond to Different First Information In a case that the terminal device indicates the first information through a first random access resource, the first information indicates that the terminal device expects to activate the SCG in an RRC connection resume process; and/or, in a case that the terminal device indicates the first information through a second random access resource, the first information indicates that the terminal device does not expect to activate the SCG in the RRC connection resume process.

For example, in a case that the first information is carried in the RRC resume request information, and the terminal device transmits the RRC resume request information by using the first random access resource, the first information indicates that the terminal device expect to activate the SCG in the RRC connection resume process. In this case, the first information may be a resource index of the first random access resource. After acquiring the resource index of the first random access resource, the network device may learn that the terminal device expects to activate the SCG in the RRC connection resume process.

For another example, in a case that the first information is carried in the RRC resume request information, and the terminal device transmits the RRC resume request information by using a second random access resource, the first information indicates that the terminal device does not expect to activate an SCG in an RRC connection resume process. In this case, the first information may be a resource index of the second random access resource. After acquiring the resource index of the second random access resource, the network device may learn that the terminal device does not expect to activate the SCG in the RRC connection resume process.

Optionally, in Example 3, the terminal device transmits the first information to the network device based on a third correspondence.

The third correspondence includes: the first random access resource corresponds to activating the SCG and the second random access resource corresponds to not activating the SCG.

Optionally, the third correspondence is pre-configured or predefined by a protocol, or the third correspondence is configured by the network device.

It is to be noted that, for a network side, the third correspondence may be kept in the MN device, or, the third correspondence may be kept in both the MN device and the SN device.

Example 4, Different Inactive Radio Network Temporary Identities (I-RNTI) Correspond to Different First Information In a case that the terminal device indicates the first information by using a first I-RNTI, the first information indicates that the terminal device expects to activate the SCG in the RRC connection resume process; and/or, in a case that the terminal device indicates the first information by using a second I-RNTI, the first information indicates that the terminal device does not expect to activate the SCG in the RRC connection resume process.

For example, in a case that the first information is carried in the RRC resume request information, and the terminal device transmits the RRC resume request information by using the first I-RNTI, the first information indicates that the terminal device expect to activate the SCG in the RRC connection resume process. In this case, the first information may be an identifier of the first I-RNTI. After acquiring the identifier of the I-RNTI, the network device may learn that the terminal device expects to activate the SCG in the RRC connection resume process.

For another example, in a case that the first information is carried in the RRC resume request information, and the terminal device transmits the RRC resume request information by using a second I-RNTI, the first information indicates that the terminal device does not expect to activate an SCG in the RRC connection resume process. In this case, the first information may be an identifier of the second I-RNTI. After acquiring the identifier of the I-RNTI, the network device may learn that the terminal device does not expect to activate the SCG in the RRC connection resume process.

Optionally, in Example 4, when the network device releases the UE to enter RRC_INACTIVE, two I-RNTIs (a first I-RNTI and a second I-RNTI) are separately configured to the UE. One is configured by an MN device, and the other one is configured by the MN device or an SN device. The MN device keeps two I-RNTIs both. If the UE initiates the RRC resume request information by using one I-RNTI (the first I-RNTI), it indicates that the SCG needs to be activated. If the UE initiates the RRC resume request information by using the other one (the second I-RNTI), it indicates that the SCG does not need to be activated.

Optionally, in Example 4, the operation that the terminal device transmits the first information to the network device includes the following operation.

The terminal device transmits the first information to the network device based on a fourth correspondence.

The fourth correspondence includes: the first CCCH corresponds to activating the SCG and the second CCCH corresponds to not activating the SCG.

Optionally, the fourth correspondence is configured by the network device when releasing the terminal device to enter an inactive state.

It is to be noted that, for a network side, the fourth correspondence may be kept in the MN device, or, the fourth correspondence may be kept in both the MN device and the SN device.

Optionally, in some embodiments, before the terminal device transmits the first information, the terminal device receives a paging message transmitted by the network device. The paging message indicates that the network device does not expect to activate the SCG, and/or, the paging message indicates an identifier list of bearers at which downlink data destined for the terminal device arrives.

For example, in a case that the downlink data destined for the terminal device exists and a bear at which the downlink data arrives is a bearer terminated at an MN, the network device transmits the paging message to the terminal device.

For another example, in a case that the downlink data destined for the terminal device exists and a bear at which the downlink data arrives does not need to use a radio resource in the SCG, the network device transmits the paging message to the terminal device.

Optionally, in the embodiments of the disclosure, the first information indicates that the terminal device does not expect to activate the SCG in the RRC connection resume process in a case that at least one of the following conditions is satisfied:

the terminal device needs to transmit uplink data and a target bearer for the uplink data is a bearer terminated at an MN;

the terminal device needs to transmit the uplink data and the target bearer for the uplink data does not need to use a radio resource in the SCG;

the terminal device learns that downlink data to be received exists and a bearer at which the downlink data arrives is a bearer terminated at the MN;

the terminal device learns that the downlink data to be received exists and the bearer at which the downlink data arrives does not need to use the radio resource in the SCG; or the network device indicates that the network device does not expect to activate the SCG through a paging message.

Optionally, in some embodiments, the network device determines whether to activate an SCG based on the first information in the RRC connection restoration process. In this case, the network device is an MN device serving the terminal device before the terminal device enters an inactive state.

That is, the network device will refer to a tendentious opinion of the terminal device when determining whether to activate an SCG in the RRC connection resume process, so as to accurately determine whether to activate the SCG, which avoids unnecessary SCG activation, and achieves the purpose of saving energy for the terminal device.

Optionally, in a case that the network device determines not to activate the SCG in the RRC connection resume process, the network device transmits second information to the terminal device. The second information instructs not to activate the SCG, or the second information instructs to keep the SCG in a suspend state. Correspondingly, the terminal device receives the second information transmitted by the network device. The second information instructs not to activate the SCG, or the second information instructs to keep the SCG in a suspend state. Therefore, the terminal device may learn processing opinions of the network device for the SCG in the RRC connection resume process, and make corresponding responses.

Optionally, if the first information is carried in a third message (Msg 3) in a four-step random access process, the second information is carried in a fourth message (Msg 4) in the four-step random access process.

Or, if the first information is carried in a first message (Msg A) in a two-step random access process, the second information is carried in a second message (Msg B) in the two-step random access process.

Optionally, in a case that the network device determines to activate the SCG in the RRC connection resume process, the network device transmits request information to a first SN device. The request information is used to request to add an SN device, and the first SN device is an SN device serving the terminal device before the terminal device enters an inactive state in the SCG. Therefore, the SN device may be added to serve the terminal device. For example, the SN device is added to receive the uplink data transmitted by the terminal device. For another example, the SN device is added to transmit downlink data to the terminal device.

Optionally, in some embodiments, in a case that the network device is an MN device other than the MN device serving the terminal device before the terminal device enters the inactive state, the network device forwards the first information to a first MN device, or, the network device forwards third information to the first MN device. The third information indicates a content indicated by the first information. The first MN device is an MN device serving the terminal device before the terminal device enters the inactive state.

Optionally, the first MN device may determine whether to activate an SCG based on the first information in the RRC connection resume process. Or, the first MN device may determine whether to activate the SCG based on the third information in the RRC connection resume process. Further, the first MN device may feed a determination result back to the terminal device.

Optionally, in some embodiments, the terminal device may transmit RRC connection resume complete information to the network device to indicate that the RRC connection has been resumed.

Therefore, in the embodiments of the disclosure, the terminal device reports whether it expects to activate the SCG in the RRC connection resume process. The network device may determine whether to activate the SCG in the RRC connection resume process with reference to instructions of the terminal device. That is to say, the terminal device and the network device coordinate to determine whether to activate the SCG in the RRC connection resume process, so as to accurately determine whether to activate the SCG, which avoids unnecessary SCG activation, and achieves the purpose of saving energy for the terminal device.

The technical solution of determining whether to activate an SCG in the RRC connection resume process in the disclosure is described in detail by the following three specific embodiments.

Figure 4:
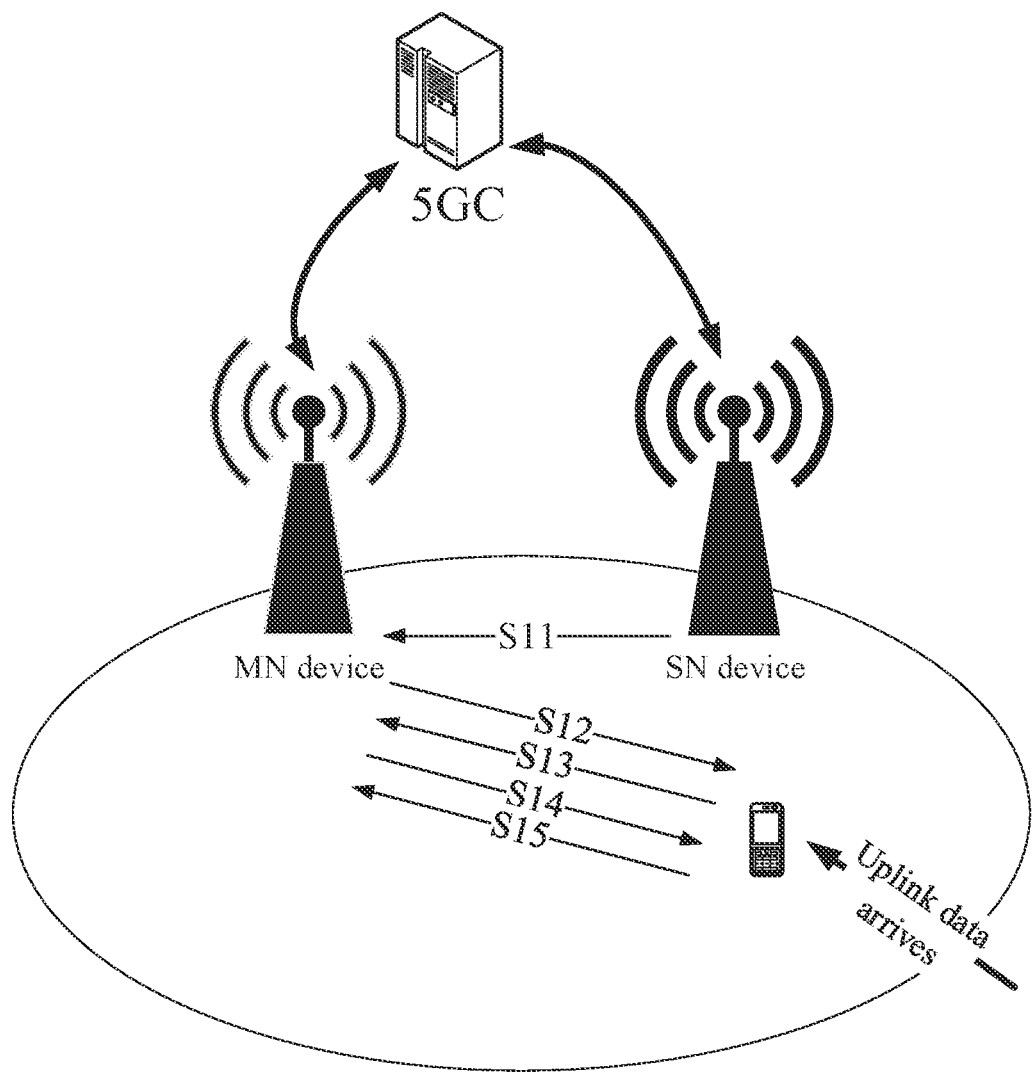
FIG. 4 illustrates a schematic flowchart of resuming an RRC connection according to an embodiment of the disclosure.

Embodiment 1, the terminal device is in an MR-DC scenario. For the terminal device in an inactive state, in a case that the terminal device has uplink data to be transmitted, the terminal device and the network device may specifically negotiate to determine whether to activate an SCG in the RRC connection resume process through S11 to S15 as shown in FIG. 4.

At S11, an SN device transmits SN activity notification information to an MN device, so that the MN device can learn that the SN device is in an active state.

At S12, the MN device transmits RRC release information to a terminal device, to release the terminal device to enter an inactive state. In this case, the SCG is in a suspend state.

At S13, the uplink data arrives at the terminal side. The terminal device transmits RRC connection resume request information to the MN device. The RRC connection resume request information includes first information. The first information indicates whether the terminal device expects to activate the SCG in the RRC connection resume process. For example, if a target bearer for the uplink data is a bearer terminated at the MN device, or, the target bearer for the uplink data does not need to use a radio resource in the SCG, then the first information indicates that the terminal device does not expect to activate the SCG in the RRC connection resume process, otherwise, the first information indicates that the terminal device expects to activate the SCG in the RRC connection resume process.

At S14, the MN device transmits RRC resume information to the terminal device. If the MN device determines not to activate the SCG in the RRC connection resume process based on the first information, the MN device may instruct not to activate the SCG in the RRC resume information, or the MN device may instruct to keep the SCG in a suspend state in the RRC resume information.

S15: The terminal device transmits RRC resume complete information to the MN device.

It is to be noted that, at S13, how the first information specifically indicates whether the terminal device expects to activate an SCG in the RRC connection resume process may refer to the implicit indication manner and the explicit indication manner of the abovementioned first information, which will not be elaborated here.

Figure 5:
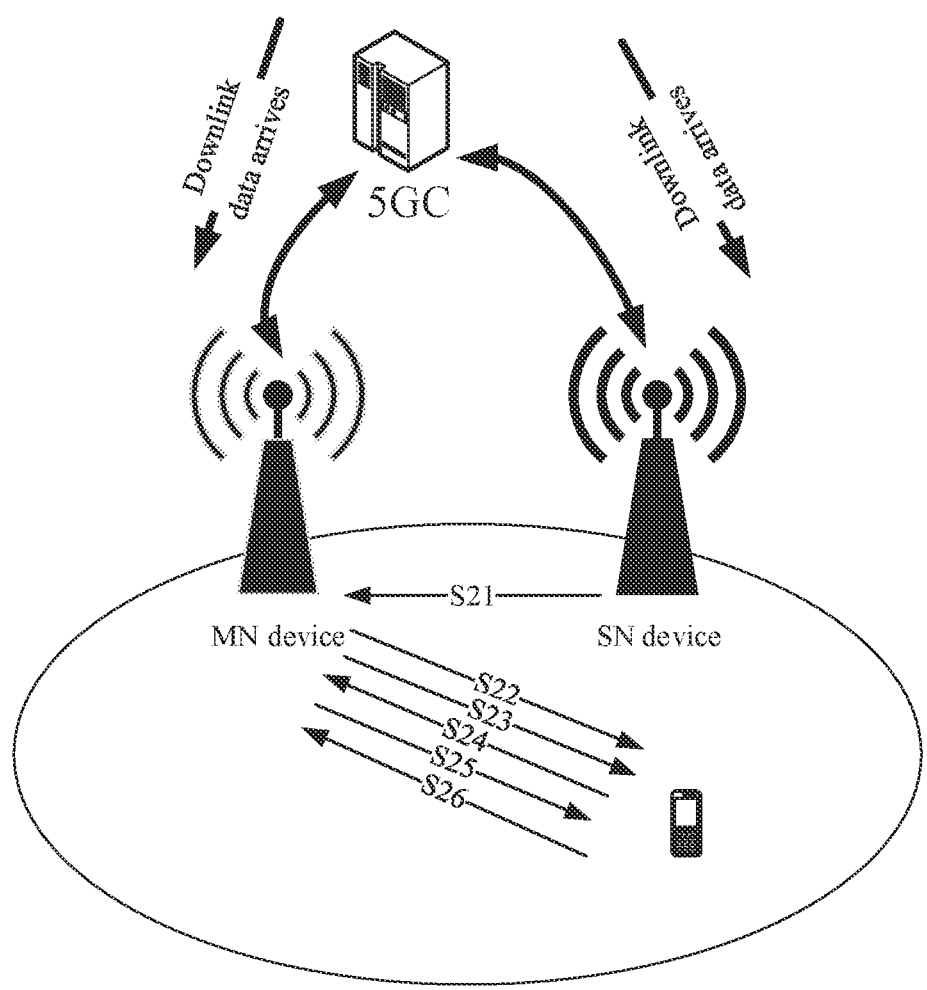
FIG. 5 illustrates another schematic flowchart of resuming an RRC connection according to an embodiment of the disclosure.

Embodiment 2, the terminal device is in an MR-DC scenario. For the terminal device in an inactive state, in a case that downlink data destined for the terminal device exists, the terminal device and the network device may specifically negotiate to determine whether to activate an SCG in the RRC connection resume process through S21 to S26 as shown in FIG. 5.

At S21, an SN device transmits SN activity notification information to an MN device, so that the MN device can learn that the SN device is in an active state.

At S22, the MN device transmits RRC release information to a terminal device, to release the terminal device to enter an inactive state. In this case, the SCG is in a suspend state.

At S23, downlink data destined for the terminal device arrives, the MN device transmits a paging message to the terminal device.

If a bearer at which the downlink data arrives is a bearer terminated at an MN, or, a bearer at which the downlink data arrives does not need to use a radio resource in the SCG, the paging message indicates that the network device does not expect to activate the SCG, and/or, the paging message indicates an identifier list of bearers at which the downlink data destined for the terminal device arrives.

At S24, the terminal device transmits RRC connection resume request information to the MN device. The RRC connection resume request information includes first information. The first information indicates whether the terminal device expects to activate the SCG in the RRC connection resume process. For example, if the bearer at which the downlink data is a bearer terminated at the MN device, or, the bearer at which the downlink data arrives does not need to use a radio resource in the SCG, or, the paging message indicates that the terminal device does not expect to activate the SCG, then the first information indicates that the terminal device does not expect to activate the SCG in the RRC connection resume process. Otherwise, the first information indicates that the terminal device expects to activate the SCG in the RRC connection resume process.

At S25, the MN device transmits RRC resume information to the terminal device. If the MN device determines not to activate the SCG in the RRC connection resume process based on the first information, the MN device may instruct not to activate the SCG in the RRC resume information, or the MN device may instruct to keep the SCG in a suspend state in the RRC resume information.

At S26, the terminal device transmits RRC resume complete information to the MN device.

It is to be noted that the first information at S24 is determined on the basis of the paging message transmitted by the MN device, and how the first information at S24 specifically indicates whether the terminal device expects to activate an SCG in the RRC connection resume process may refer to an implicit indication manner and an explicit indication manner of the abovementioned first information, which will not be elaborated here.

Figure 6:
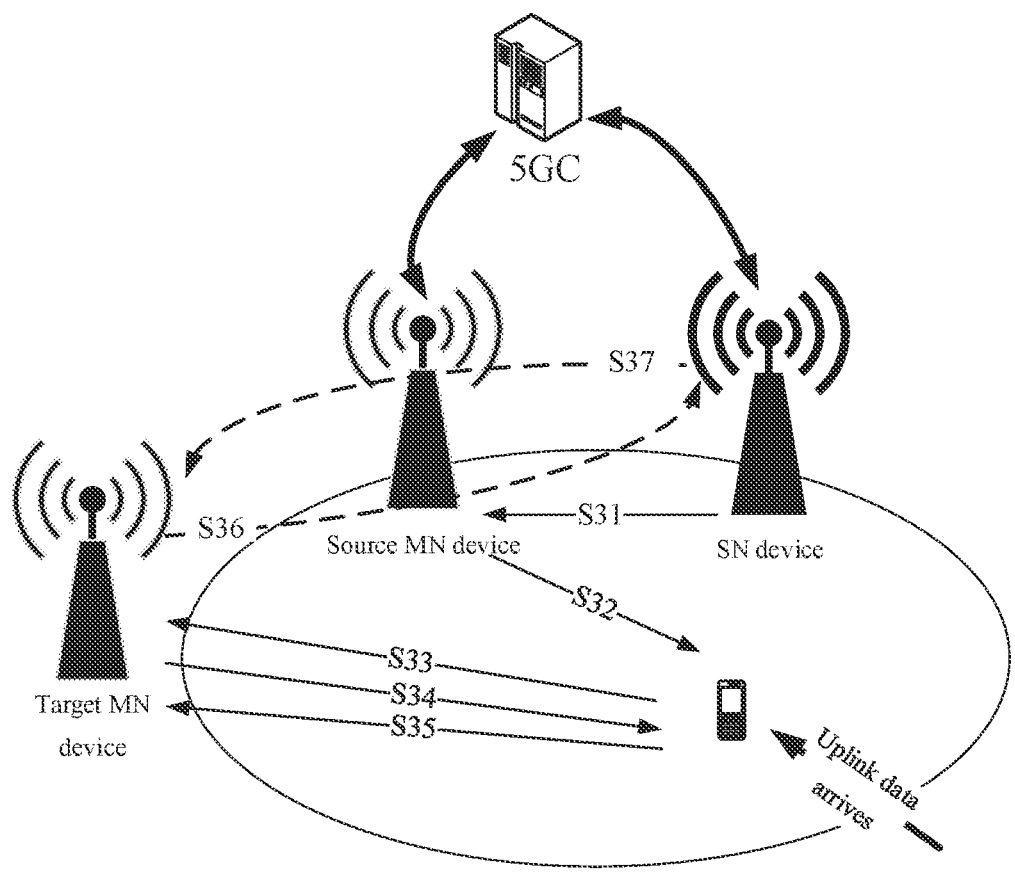
FIG. 6 illustrates yet another schematic flowchart of resuming an RRC connection according to an embodiment of the disclosure.

Embodiment 3, the terminal device is in an MR-DC scenario. For the terminal device in an inactive state, in a case that the terminal device has uplink data to be transmitted, the terminal device and the network device may specifically negotiate to determine whether to activate an SCG in the RRC connection resume process through S31 to S37 as shown in FIG. 6. As shown in FIG. 6, a source MN device is an MN device serving the terminal device before the terminal device enters an inactive state, and a target MN device is an MN device that the terminal device newly accesses in the RRC connection resume process.

At S31, an SN device transmits SN activity notification information to a source MN device, so that the source MN device can learn that the SN device is in an active state.

At S32, the source MN device transmits RRC release information to a terminal device, to release the terminal device to enter an inactive state. In this case, the SCG is in a suspend state.

At S33, the uplink data arrives at the terminal side. The terminal device transmits RRC connection resume request information to a target MN device. The RRC connection resume request information includes first information. The first information indicates whether the terminal device expects to activate the SCG in the RRC connection resume process. For example, if a target bearer for the uplink data is a bearer terminated at the MN device, or, the target bearer for the uplink data does not need to use a radio resource in the SCG, then the first information indicates that the terminal device does not expect to activate the SCG in the RRC connection resume process, otherwise, the first information indicates that the terminal device expects to activate the SCG in the RRC connection resume process.

At S34, the target MN device transmits RRC resume information to the terminal device. If the target MN device determines not to activate the SCG in the RRC connection resume process based on the first information, the target MN device may instruct not to activate the SCG in the RRC resume information, or, the target MN device may instruct to keep the SCG in a suspend state in the RRC resume information.

At S35, the terminal device transmits RRC resume complete information to the target MN device.

At S36, if the target MN device determines to activate the SCG based on the first information in the RRC connection resume process, the target MN target transmits S-NODE ADDITION REQUEST information to the SN device. The S-NODE ADDITION REQUEST information includes indication information. The indication information indicates to activate the SCG.

At S37, the SN device transmits S-NODE ADDITION REQUEST Acknowledge information to the target MN device, to activate the SCG.

It is to be noted that, at S33, how the first information specifically indicates whether the terminal device expects to activate an SCG in the RRC connection resume process may refer to the implicit indication manner and the explicit indication manner of the abovementioned first information, which will not be elaborated here.

Method embodiments of the disclosure are described in detail above with reference to FIG. 3 to FIG. 6. Apparatus embodiments of the disclosure will be described in detail below with reference to FIG. 7 to FIG. 11. It is to be understood that the apparatus embodiments correspond to the method embodiments. Similar description may refer to the method embodiments.

Figure 7:
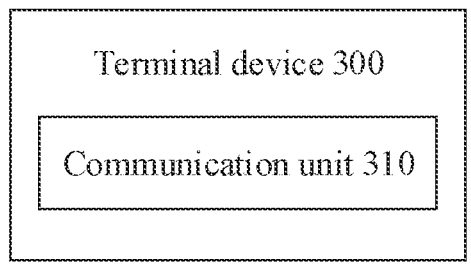
FIG. 7 illustrates a schematic block diagram of a terminal device according to an embodiment of the disclosure.

FIG. 7 is a schematic block diagram of a terminal device 300 according to an embodiment of this disclosure. As shown in FIG. 7, the terminal device 300 includes a communication unit 310.

The communication unit 310 is configured to transmit first information to a network device. The first information indicates whether the terminal device expects to activate an SCG in an RRC connection resume process.

Optionally, in a case that the terminal device indicates the first information through a first CCCH, the first information indicates that the terminal device expects to activate the SCG in the RRC connection resume process; and/or, in a case that the terminal device indicates the first information through a second CCCH, the first information indicates that the terminal device does not expect to activate the SCG in the RRC connection resume process.

Optionally, the communication unit 310 is specifically configured to:

transmit the first information to the network device based on a first correspondence.

The first correspondence includes: the first CCCH corresponds to activating the SCG and the second CCCH corresponds to not activating the SCG.

Optionally, the first correspondence is pre-configured or agreed by a protocol, or the first correspondence is configured by the network device.

Optionally, in a case that the terminal device indicates the first information through a first preamble, the first information indicates that the terminal device expects to activate the SCG in the RRC connection resume process; and/or, in a case that the terminal device indicates the first information through a second preamble, the first information indicates that the terminal device does not expect to activate the SCG in the RRC connection resume process.

Optionally, the communication unit 310 is specifically configured to:

transmit the first information to the network device based on a second correspondence.

The second correspondence includes: the first preamble corresponds to activating the SCG and the second preamble corresponds to not activating the SCG.

Optionally, the second correspondence is pre-configured or predefined by a protocol, or the second correspondence is configured by the network device.

Optionally, in a case that the terminal device indicates the first information through a first random access resource, the first information indicates that the terminal device expects to activate the SCG in the RRC connection resume process; and/or, in a case that the terminal device indicates the first information through a second random access resource, the first information indicates that the terminal device does not expect to activate the SCG in the RRC connection resume process.

Optionally, the communication unit 310 is specifically configured to:

transmit the first information to the network device based on a third correspondence.

The third correspondence includes: the first random access resource corresponds to activating the SCG and the second random access resource corresponds to not activating the SCG.

Optionally, the third correspondence is pre-configured or predefined by a protocol, or the third correspondence is configured by the network device.

Optionally, in a case that the terminal device indicates the first information by using a first I-RNTI, the first information indicates that the terminal device expects to activate the SCG in the RRC connection resume process; and/or, in a case that the terminal device indicates the first information by using a second I-RNTI, the first information indicates that the terminal device does not expect to activate the SCG in the RRC connection resume process.

Optionally, the communication unit 310 is specifically configured to:

transmit the first information to the network device based on a fourth correspondence.

The fourth correspondence includes: the first I-RNTI corresponds to activating the SCG and the second I-RNTI corresponds to not activating the SCG.

Optionally, the fourth correspondence is configured by the network device when releasing the terminal device to enter an inactive state.

Optionally, the first information is carried in RRC signaling, and the first information occupies a spare bit in the RRC signaling.

Optionally, the first information is carried in RRC signaling.

Optionally, the RRC signaling is RRC resume request information.

Optionally, before the terminal device transmits the first information, the communication unit 310 is further configured to receive a paging message transmitted by the network device. The paging message indicates that the network device does not expect to activate the SCG, and/or, the paging message indicates an identifier list of bearers at which downlink data destined for the terminal device arrives.

Optionally, the first information indicates that the terminal device does not expect to activate the SCG in the RRC connection resume process in a case that at least one of the following conditions is satisfied:
- the terminal device needs to transmit uplink data and a target bearer for the uplink data is a bearer terminated at an MN;
- the terminal device needs to transmit the uplink data and the target bearer for the uplink data does not need to use a radio resource in the SCG;
- the terminal device learns that downlink data to be received exists and a bearer at which the downlink data arrives is a bearer terminated at the MN;
- the terminal device learns that the downlink data to be received exists and the bearer at which the downlink data arrives does not need to use the radio resource in the SCG; or
- the network device indicates that the network device does not expect to activate the SCG through a paging message.

Optionally, the first information is carried in a third message in a four-step random access process; or the first information is carried in a first message in a two-step random access process.

Optionally, the communication unit 310 is further configured to receive second information transmitted by the network device. The second information instructs not to activate the SCG, or the second information instructs to keep the SCG in a suspend state.

Optionally, in a case that the first information is carried in a third message in a four-step random access process, the second information is carried in a fourth message in the four-step random access process; or
in a case that the first information is carried in a first message in a two-step random access process, the second information is carried in a second message in the two-step random access process.

Optionally, the terminal device is in an inactive state, and the terminal device is in an MR-DC scenario before entering the inactive state.

Optionally, the network device is an MN device serving the terminal device before the terminal device enters an inactive state, or the network device is an MN device other than an MN device serving the terminal device before the terminal device enters an inactive state.

Optionally, in some embodiments, the abovementioned communication unit may be a communication interface or a transceiver, or a communication chip, or an input/output interface of a system on chip.

It is to be understood that the terminal device 300 according to the embodiment of the disclosure may correspond to the terminal device in the method embodiments of the disclosure, and the abovementioned and other operations and/or functions of each unit in the terminal device 300 are used to implement the corresponding flows executed by the terminal device in the method 200 shown in FIG. 3 respectively and will not be elaborated here for simplicity.

Figure 8:
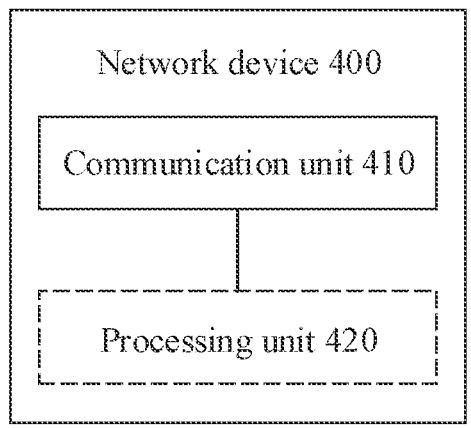
FIG. 8 illustrates a schematic block diagram of a network device according to an embodiment of the disclosure.

FIG. 8 illustrates a schematic block diagram of a network device 400 according to an embodiment of the disclosure. As shown in FIG. 8, the network device 400 includes a communication unit 410.

The communication unit 410 is configured to receive first information transmitted by a terminal device. The first information indicates whether the terminal device expects to activate an SCG in an RRC connection resume process.

Optionally, in a case that the terminal device indicates the first information through a first CCCH, the first information indicates that the terminal device expects to activate the SCG in the RRC connection resume process; and/or,
in a case that the terminal device indicates the first information through a second CCCH, the first information indicates that the terminal device does not expect to activate the SCG in the RRC connection resume process.

Optionally, the first information is transmitted by the terminal device based on a first correspondence.

The first correspondence includes: the first CCCH corresponds to activating the SCG and the second CCCH corresponds to not activating the SCG.

Optionally, the first correspondence is pre-configured or predefined by a protocol, or the first correspondence is configured by the network device.

Optionally, in a case that the terminal device indicates the first information through a first preamble, the first information indicates that the terminal device expects to activate the SCG in the RRC connection resume process; and/or,
in a case that the terminal device indicates the first information through a second preamble, the first information indicates that the terminal device does not expect to activate the SCG in the RRC connection resume process.

Optionally, the first information is determined by the terminal device based on a second correspondence.

The second correspondence includes: the first preamble corresponds to activating the SCG and the second preamble corresponds to not activating the SCG.

Optionally, the second correspondence is pre-configured or predefined by a protocol, or the second correspondence is configured by the network device.

Optionally, in a case that the terminal device indicates the first information through a first random access resource, the first information indicates that the terminal device expects to activate the SCG in the RRC connection resume process; and/or,
in a case that the terminal device indicates the first information through a second random access resource, the first information indicates that the terminal device does not expect to activate the SCG in the RRC connection resume process.

Optionally, the first information is transmitted by the terminal device based on a third correspondence.

The third correspondence includes: the first random access resource corresponds to activating the SCG and the second random access resource corresponds to not activating the SCG.

Optionally, the third correspondence is pre-configured or predefined by a protocol, or the third correspondence is configured by the network device.

In a case that the terminal device indicates the first information by using a first I-RNTI, the first information indicates that the terminal device expects to activate the SCG in the RRC connection resume process; and/or, in a case that the terminal device indicates the first information by using a second I-RNTI, the first information indicates that the terminal device does not expect to activate the SCG in the RRC connection resume process.

Optionally, the first information is transmitted by the terminal device based on a fourth correspondence.

The fourth correspondence includes: the first I-RNTI corresponds to activating the SCG and the second I-RNTI corresponds to not activating the SCG.

Optionally, the fourth correspondence is configured by the network device when releasing the terminal device to enter an inactive state.

Optionally, the first information is carried in RRC signaling, and the first information occupies a spare bit in the RRC signaling.

Optionally, the first information is carried in RRC signaling.

Optionally, the RRC signaling is RRC resume request information.

Optionally, in a case that downlink data destined for the terminal device exists and a bearer at which the downlink data arrives is a bearer terminated at an MN, the communication unit 410 is further configured to transmit a paging message to the terminal device, or, in a case that the downlink data destined for the terminal device exists and the bearer at which the downlink data arrives does not need to use a radio resource in the SCG, the communication unit 410 is further configured to transmit the paging message to the terminal device.

The paging message indicates at least one of: the network device does not expect to activate the SCG, or an identifier list of bearers at which downlink data destined for the terminal device arrives.

Optionally, the first information indicates that the terminal device does not expect to activate the SCG in the RRC connection resume process in a case that at least one of the following conditions is satisfied:

the terminal device needs to transmit uplink data and a target bearer for the uplink data is a bearer terminated at an MN;

the terminal device needs to transmit the uplink data and the target bearer for the uplink data does not need to use a radio resource in the SCG;

the terminal device learns that downlink data to be received exists and a bearer at which the downlink data arrives is a bearer terminated at the MN;

the terminal device learns that the downlink data to be received exists and the bearer at which the downlink data arrives does not need to use the radio resource in the SCG; or the network device indicates that the network device does not expect to activate the SCG through a paging message.

Optionally, the network device 400 further includes a processing unit 420.

The processing unit 420 is configured to determine whether to activate the SCG based on the first information in the RRC connection resume process.

Optionally, in a case that the network device determines not to activate the SCG in the RRC connection resume process, the communication unit 410 is further configured to transmit the second information to the terminal device. The second information instructs not to activate the SCG, or the second information instructs to keep the SCG in a suspend state.

Optionally, the first information is carried in a third message in a four-step random access process, and the second information is carried in a fourth message in the four-step random access process; or the first information is carried in a first message in a two-step random access process, and the second information is carried in a second message in the two-step random access process.

Optionally, in a case that the network device determines to activate the SCG in the RRC connection resume process, the communication unit 410 is further configured to transmit request information to a first SN device. The request information is used to request to add an SN device, and the first SN device is an SN device serving the terminal device before the terminal device enters an inactive state in the SCG.

Optionally, in a case that the network device is an MN device other than the MN device serving the terminal device before the terminal device enters the inactive state, the communication unit 410 is further configured to forward the first information to a first MN device, or the communication unit 410 is further configured to transmit third information to the first MN device. The third information indicates a content indicated by the first information. The first MN device is an MN device serving the terminal device before the terminal device enters the inactive state.

Optionally, the terminal device is in an inactive state, and the terminal device is in an MR-DC scenario before entering the inactive state.

Optionally, in some embodiments, the abovementioned communication unit may be a communication interface or a transceiver, or a communication chip, or an input/output interface of a system on chip. The abovementioned processing unit may be one or more processors.

It is to be understood that the network device 400 according to the embodiment of the disclosure may correspond to the network device in the method embodiments of the disclosure, and the abovementioned and other operations and/or functions of each unit in the network device 400 are used to implement the corresponding flows executed by the terminal device in the method 200 shown in FIG. 3 respectively and will not be elaborated here for simplicity.

Figure 9:
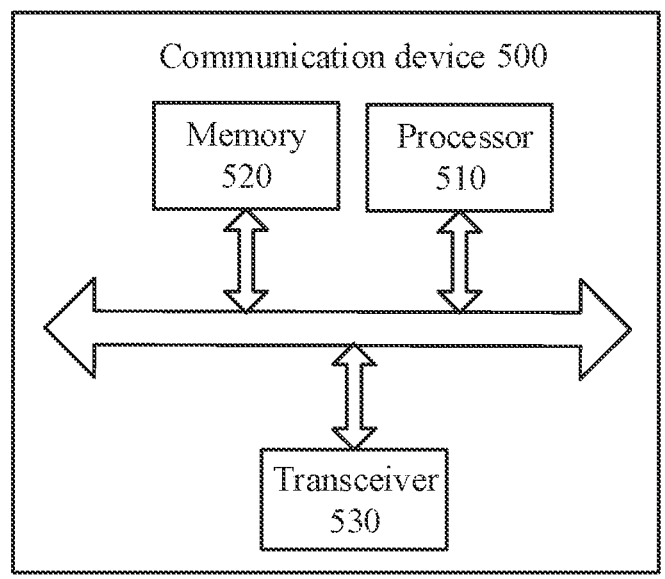
FIG. 9 illustrates a schematic block diagram of a communication device according to an embodiment of the disclosure.

FIG. 9 is a schematic structural diagram of a communication device 500 according to an embodiment of the present disclosure. The communication device 500 shown in FIG. 9 includes a processor 510 that may call and execute a computer program in a memory to implement the method of the embodiments of the present disclosure.

Optionally, as shown in FIG. 9, the communication device 500 may further include a memory 520. The processor 510 may call and execute a computer program from the memory 520 to implement the method of the embodiments of the present disclosure.

The memory 520 may be a separate device independent of the processor 510, or may be integrated into the processor 510.

Optionally, as shown in FIG. 9, the communication device 500 may further include a transceiver 530 that may be controlled by the processor 510 to communicate with other devices, in particular sending information or data to other devices, or receiving information or data sent by other devices.

The transceiver 530 may include a transmitter and a receiver. The transceiver 530 may further include antennas. The number of antennas may be one or more.

Optionally, the communication device 500 may be the network device of the embodiments of the disclosure, and the communication device 500 may implement the corresponding operations implemented by the network device in each method of the embodiments of the disclosure. For brevity, details are not described herein.

Optionally, the communication device 500 may be the mobile terminal/terminal device of the embodiments of the disclosure, and the communication device 500 may implement the corresponding operations implemented by the mobile terminal/terminal device in each method of the embodiments of the disclosure. For brevity, details are not described herein.

Figure 10:
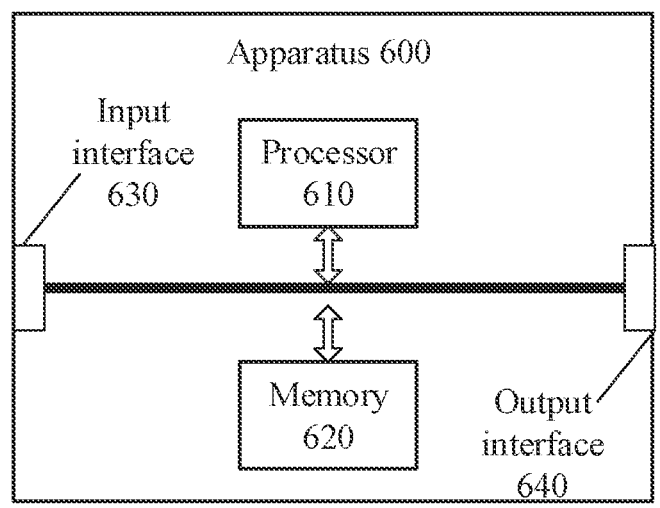
FIG. 10 illustrates a schematic block diagram of an apparatus according to an embodiment of the disclosure.

FIG. 10 is a schematic structural diagram of an apparatus according to an embodiment of the present disclosure. The apparatus 600 shown in FIG. 10 includes a processor 610 that may call and execute a computer program in a memory to implement the method of the embodiments of the present disclosure.

Optionally, as shown in FIG. 10, the apparatus 600 may further include a memory 620. The processor 610 may call and execute a computer program from the memory 620 to implement the method of the embodiments of the present disclosure.

The memory 620 may be a separate device independent of the processor 610, or may be integrated into the processor 610.

Optionally, the apparatus 600 may further include an input interface 630. The processor 610 may control the input interface 630 to communicate with other devices or chips, and specifically, may obtain information or data transmitted by the other devices or chips.

Optionally, the apparatus 600 may further include an output interface 640. The processor 610 may control the output interface 640 to communicate with other devices or chips, and specifically, may output information or data to other devices or chips.

Optionally, the apparatus may be applied to the network device in the embodiments of the present disclosure, and the apparatus may implement the corresponding operations implemented by the network device in each method of the embodiments of the present disclosure. For brevity, details are not described herein.

Optionally, the apparatus may be applied to the mobile terminal/terminal device in the embodiments of the present disclosure, and the apparatus may implement the corresponding operations implemented by the mobile terminal/terminal device in each method of the embodiments of the present disclosure. For brevity, details are not described herein.

Optionally, the apparatus mentioned in the embodiments of the present disclosure may also be a chip, such as a system-level chip, a system chip, a chip system, or a system-on-chip.

Figure 11:
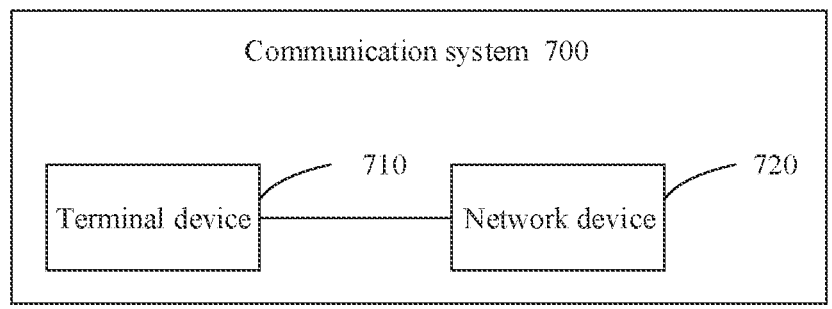
FIG. 11 illustrates a schematic block diagram of a communication system according to an embodiment of the disclosure.

FIG. 11 is a schematic block diagram of a communication system 700 according to an embodiment of the present disclosure. As shown in FIG. 11, the communication system 700 includes a terminal device 710 and a network device 720.

The terminal device 710 may be configured to implement a corresponding function implemented by the terminal device in the method described above, and the network device 720 may be configured to implement a corresponding function implemented by the network device in the method described above. For brevity, details are not described herein.

It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be an ROM, a programmable ROM (PROM), an Erasable PROM (EPROM), an Electrically EPROM (EEPROM) or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

An embodiment of the disclosure further provides a computer-readable storage medium, which is configured to store a computer program.

Optionally, the computer-readable storage medium may be applied to a network device in the embodiments of the disclosure, and the computer program enables a computer to execute corresponding operations implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding operations implemented by the mobile terminal/terminal device in each method of the embodiments of the disclosure. For simplicity, elaborations are omitted herein.

An embodiment of the disclosure further provides a computer program product, which includes a computer program instruction.

Optionally, the computer program product may be applied to a network device in the embodiments of the disclosure, and the computer program instruction enables a computer to execute corresponding operations implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding operations implemented by the mobile terminal/terminal device in each method of the embodiments of the disclosure. For simplicity, elaborations are omitted herein.

An embodiment of the disclosure further provides a computer program.

Optionally, the computer program may be applied to a network device in the embodiments of the disclosure, and the computer program runs in a computer to enable the computer to execute corresponding operations implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific disclosures and design constraints of the technical solutions. Professionals may realize the described functions for each specific disclosure by use of different methods, but such realization shall fall within the scope of the disclosure.

Those skilled in the art may clearly learn about that regarding specific operating processes of the system, device and unit described above, reference may be made to the corresponding processes in the method embodiment. The operating processes are not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be omitted or not executed. In addition, coupling or direct coupling or communication connection between displayed or discussed components may be indirect coupling or communication connection implemented through some interfaces, the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, all functional units in each embodiment of the disclosure may be integrated into a processing unit, or each functional unit may also physically exist independently, and two or more than two functional units may also be integrated into a unit.

When being realized in form of software functional unit and sold or used as an independent product, the function may also be stored in a computer-readable storage medium. For such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, an ROM, an RAM, a magnetic disk or an optical disk.

The forgoing is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
   transmitting, by a terminal device, first information to a network device, wherein the first information indicates whether the terminal device expects to activate a Secondary Cell Group (SCG) in a Radio Resource Control (RRC) connection resume process,
   wherein at least one of the following applies:
   in a case that the terminal device indicates the first information through a first Common Control Channel (CCCH), the first information indicates that the terminal device expects to activate the SCG in the RRC connection resume process; or
   in a case that the terminal device indicates the first information through a second CCCH, the first information indicates that the terminal device does not expect to activate the SCG in the RRC connection resume process;
   wherein transmitting, by the terminal device, the first information to the network device comprises:

transmitting, by the terminal device, the first information to the network device based on a first correspondence, wherein the first correspondence comprises: the first CCCH corresponds to activating the SCG and the second CCCH corresponds to not activating the SCG.

2. The method of claim 1, wherein the first information indicates that the terminal device does not expect to activate the SCG in the RRC connection resume process in a case that at least one of the following conditions is satisfied:
the terminal device needs to transmit uplink data and a target bearer for the uplink data is a bearer terminated at a Master Node (MN);
the terminal device needs to transmit the uplink data and the target bearer for the uplink data does not need to use a radio resource in the SCG;
the terminal device learns that downlink data to be received exists and a bearer at which the downlink data arrives is a bearer terminated at the MN;
the terminal device learns that the downlink data to be received exists and the bearer at which the downlink data arrives does not need to use the radio resource in the SCG; or
the network device indicates that the network device does not expect to activate the SCG through a paging message.

3. The method of claim 1, further comprising:
receiving, by the terminal device, second information transmitted by the network device, wherein the second information instructs not to activate the SCG, or the second information instructs to keep the SCG in a suspend state.

4. The method of claim 1, wherein the terminal device is in an inactive state, and the terminal device is in a Multi-Radio Access Technology (RAT) Dual Connectivity (MR-DC) scenario before entering the inactive state.

5. The method of claim 1, wherein at least one of the following applies:
in a case that the terminal device indicates the first information by using a first Inactive Radio Network Temporary Identity (I-RNTI), the first information indicates that the terminal device expects to activate the SCG in the RRC connection resume process; or
in a case that the terminal device indicates the first information by using a second I-RNTI, the first information indicates that the terminal device does not expect to activate the SCG in the RRC connection resume process.

6. The method of claim 5, wherein transmitting, by the terminal device, the first information to the network device comprises:
transmitting, by the terminal device, the first information to the network device based on a fourth correspondence, wherein the fourth correspondence comprises: the first I-RNTI corresponds to activating the SCG and the second I-RNTI corresponds to not activating the SCG.

7. A terminal device, comprising:
a processor;
a transceiver; and
a memory for storing a computer program that, when executed by the processor, cause the processor to control the transceiver to:
transmit first information to a network device, wherein the first information indicates whether the terminal device expects to activate a Secondary Cell Group (SCG) in a Radio Resource Control (RRC) connection resume process,
wherein at least one of the following applies:
in a case that the terminal device indicates the first information through a first Common Control Channel (CCCH), the first information indicates that the terminal device expects to activate the SCG in the RRC connection resume process; or
in a case that the terminal device indicates the first information through a second CCCH, the first information indicates that the terminal device does not expect to activate the SCG in the RRC connection resume process;
wherein transmitting, by the terminal device, the first information to the network device comprises:
transmitting, by the terminal device, the first information to the network device based on a first correspondence, wherein the first correspondence comprises: the first CCCH corresponds to activating the SCG and the second CCCH corresponds to not activating the SCG.

8. The terminal device of claim 7, wherein the first information indicates that the terminal device does not expect to activate the SCG in the RRC connection resume process in a case that at least one of the following conditions is satisfied:
the terminal device needs to transmit uplink data and a target bearer for the uplink data is a bearer terminated at a Master Node (MN);
the terminal device needs to transmit the uplink data and the target bearer for the uplink data does not need to use a radio resource in the SCG;
the terminal device learns that downlink data to be received exists and a bearer at which the downlink data arrives is a bearer terminated at the MN;
the terminal device learns that the downlink data to be received exists and the bearer at which the downlink data arrives does not need to use the radio resource in the SCG; or
the network device indicates that the network device does not expect to activate the SCG through a paging message.

9. The terminal device of claim 7, wherein the transceiver is further configured to receive second information transmitted by the network device, wherein the second information instructs not to activate the SCG, or the second information instructs to keep the SCG in a suspend state.

10. The terminal device of claim 7, wherein the terminal device is in an inactive state, and the terminal device is in a Multi-Radio Access Technology (RAT) Dual Connectivity (MR-DC) scenario before entering the inactive state.

11. The terminal device of claim 7, wherein at least one of the following applies:
in a case that the terminal device indicates the first information through a first preamble, the first information indicates that the terminal device expects to activate the SCG in the RRC connection resume process; or
in a case that the terminal device indicates the first information through a second preamble, the first information indicates that the terminal device does not expect to activate the SCG in the RRC connection resume process.

12. The terminal device of claim 11, wherein the transceiver is specifically configured to:

transmit the first information to the network device based on a second correspondence, wherein the second correspondence comprises: the first preamble corresponds to activating the SCG and the second preamble corresponds to not activating the SCG.

13. The terminal device of claim 7, wherein the first information is carried in RRC signaling, and the first information occupies a spare bit in the RRC signaling.

14. A network device, comprising:
a processor;
a transceiver; and
a memory for storing a computer program that, when executed by the processor, cause the processor to control the transceiver to:
receive first information transmitted by a terminal device, wherein the first information indicates whether the terminal device expects to activate a Secondary Cell Group (SCG) in a Radio Resource Control (RRC) connection resume process,
wherein at least one of the following applies:
in a case that the terminal device indicates the first information through a first Common Control Channel (CCCH), the first information indicates that the terminal device expects to activate the SCG in the RRC connection resume process; or
in a case that the terminal device indicates the first information through a second CCCH, the first information indicates that the terminal device does not expect to activate the SCG in the RRC connection resume process;
wherein transmitting, by the terminal device, the first information to the network device comprises:
transmitting, by the terminal device, the first information to the network device based on a first correspondence, wherein the first correspondence comprises: the first CCCH corresponds to activating the SCG and the second CCCH corresponds to not activating the SCG.

15. The network device of claim 14, wherein the first information indicates that the terminal device does not expect to activate the SCG in the RRC connection resume process in a case that at least one of the following conditions is satisfied:
the terminal device needs to transmit uplink data and a target bearer for the uplink data is a bearer terminated at a Master Node (MN);
the terminal device needs to transmit the uplink data and the target bearer for the uplink data does not need to use a radio resource in the SCG;

the terminal device learns that downlink data to be received exists and a bearer at which the downlink data arrives is a bearer terminated at the MN;
the terminal device learns that the downlink data to be received exists and the bearer at which the downlink data arrives does not need to use the radio resource in the SCG; or
the network device indicates that the network device does not expect to activate the SCG through a paging message.

16. The network device of claim 14, wherein the processor is configured to:
determine whether to activate the SCG based on the first information in the RRC connection resume process.

17. The network device of claim 16, wherein
in a case that the network device determines not to activate the SCG in the RRC connection resume process, the transceiver is further configured to transmit second information to the terminal device, wherein the second information instructs not to activate the SCG, or the second information instructs to keep the SCG in a suspend state.

18. The network device of claim 14, wherein the terminal device is in an inactive state, and the terminal device is in a Multi-Radio Access Technology (RAT) Dual Connectivity (MR-DC) scenario before entering the inactive state.

19. The network device of claim 14, wherein at least one of the following applies:
in a case that the terminal device indicates the first information through a first random access resource, the first information indicates that the terminal device expects to activate the SCG in the RRC connection resume process; or
in a case that the terminal device indicates the first information through a second random access resource, the first information indicates that the terminal device does not expect to activate the SCG in the RRC connection resume process.

20. The network device of claim 19, wherein
the first information is transmitted by the terminal device based on a third correspondence, wherein
the third correspondence comprises: the first random access resource corresponds to activating the SCG and the second random access resource corresponds to not activating the SCG.

* * * * *